Patented Apr. 25, 1944

2,347,434

UNITED STATES PATENT OFFICE 2,347,434

STABILIZATION OF PERACID SOLUTIONS

Joseph S. Reichert, Samuel A. McNeight, and Arthur A. Elston, Niagara Falls, N. Y., assignors to E. I. du Pont de Nemours & Company, Wilmington, Del., a corporation of Delaware No Drawing. Application June 30, 1941, Serial No. 400,570

17 Claims. (Cl. 260—502)

This invention relates to the stabilization of solutions of peracids. It is particularly concerned with the stabilization of solutions of peracids, or solutions of their salts, with pyrophosphoric acid, tetrasodium pyrophosphate or other equivalent pyrophosphoric acid salts.

Solutions of peracids or their salts may be prepared by various known procedures. As a class they have been found definitely superior to peroxygen compounds such as hydrogen peroxide when utilized as bleaching agents. Because of their increased bleaching activity, as compared with hydrogen peroxide, the desired bleaching effect may be obtained more rapidly and at lower temperatures and concentrations than usual when employing the customary inorganic peroxygen compounds. Moreover, the peracids are effective in neutral and acid solutions as well as in alkaline solutions. To this extent they are more versatile bleaching agents than the usual inorganic peroxygen compounds.

However, in the past, solutions of the peracids and their salts, particularly the inorganic peracids and persalts, have not been effectively employed for bleaching purposes because of the instability of such solutions. The fact that they are considerably less stable than solutions of hydrogen peroxide has seriously restricted their field of useful application. It is the principal object of this invention to develop stabilizers for solutions of the peracids and their salts, particularly solutions of organic peracids and persalts, which stabilizers will so stabilize these solutions that they may be effectively employed for general bleaching operations.

While our improved stabilizing agents are effective for stabilizing various types of peracids, such as the monoperacids, diperacids, and triperacids, it is in the field of the organic monoperacids that our invention finds its greatest utility. In this field the monobasic aliphatic peracids, such as peracetic acid, have proved to be among the more effective bleaching agents when utilized in aqueous solution stabilized in accordance with our improved procedure.

The peracids may be generally regarded as derived from acids by replacement of one or more of the hydroxyl groups containing an ionizable hydrogen atom by the perhydroxyl group OOH. The monoperacids constitute a class of acids chemically characterized by the presence of one perhydroxyl group OOH as part of the molecule. It is with the class of organic monoperacids that our stabilizers have thus far proved most effective. These acids may be regarded as derived from organic acids by replacing an hydroxyl group containing an ionizable hydrogen atom by the perhydroxyl group OOH. A typical example of the organic monoperacids, monopersuccinic acid, may thus be regarded as derived from succinic acid,

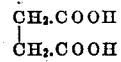

by the replacement of a hydroxyl group containing an ionizable hydrogen atom by the perhydroxyl group to yield a compound of the formula

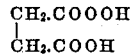

Other examples of organic monoperacids, the stabilization of which acids and their salts in aqueous solutions constitutes the primary object of this invention, are monoperphthalic acid, peracetic acid, monopermaleic acid, monoperglutaric acid, and monoperterephthalic acid. In addition to such monoperacids derived from organic acids containing one or more carboxyl groups, there are of course monoperacids derived by the introduction of a perhydroxyl group into other classes of organic acids. Thus the monoperacid may be derived by introducing a perhydroxyl group in place of the hydroxyl group containing the ionizable hydrogen atom of a hydroxy organic acid. Monoperacids may in this way be derived from all classes of saturated and unsaturated acids, whether those acids be aliphatic or aromatic. Other organic acids not characterized by the presence of a carboxyl group, such as the sulfonic acids, either aliphatic or aromatic, may also be included as suitable compounds from which to prepare suitable peracids, either monoperacids or higher acids, the stabilization of the aqueous solutions of which acids and their salts is the primary object of this invention.

Peracids may be derived from heterocyclic compounds such as furoic acid. Such acids may of course be either monoperacids, diperacids, or even, under certain circumstances, triperacids.

Among aliphatic organic acids from which monoperacids may be prepared may be mentioned both monobasic acids, of which acetic acid is an example, as well as dibasic acids, of which succinic acid is an example. Among hydroxy acids which yield peracids, the stabilization in aqueous solution of which is an object of our invention, are acids such as lactic acid, glycolic acid, tartaric acid and malic acid. Unsaturated aliphatic dibasic acids such as maleic acid, and monobasic acids such as crotonic acid, also yield corresponding peracids. Among keto acids yielding peracids having a tendency to decompose in aqueous solution unless satisfactorily stabilized may be mentioned aceto-acetic acid and benzoyl benzoic acid.

The aromatic acids also yield peracids, a typical example of which is monoperbenzoic acid, prepared by replacing the hydroxyl group containing the ionizable hydrogen atom of benzoic acid by a perhydroxyl group. Other aromatic acids yielding peracids include phthalic acid, yielding monoperphthalic acid, as well as various alicyclic organic acids such as cyclohexane carboxylic acid and cyclohexane dicarboxylic acid. Among specific sulfonic acids from which both monoperacids and, where two ionizable hydrogen atoms are present, diperacids may be derived, are acids such as benzene sulfonic acid and naphthalene sulfonic acid. Among heterocyclic acids, nicotinic acid, quinolinic acid and furoic acid are also compounds from which peracids may be derived.

These peracids when present in aqueous solution may of course exist in the form of the acids themselves, or as the salts of these acids, depending on the pH of the particular solution. Since the peracids and their salts are, when employed for various oxidizing and bleaching purposes, the full equivalents of each other, our improved procedure for stabilizing the aqueous solutions of these compounds, while disclosed herein with particular reference to the peracids themselves, is also equally effective for stabilizing aqueous solutions of their salts.

Pyrophosphoric acid and its salts have been used to some extent for the stabilization of inorganic peroxide solutions. For example, the Reichert Patent 2,027,838 discloses the use of pyrophosphoric acid or its salts as stabilizers for hydrogen peroxide solutions. However, the stabilization of solutions of organic peracids and their salts cannot be considered as a part of the art of stabilizing inorganic peroxide solutions. Fundamental differences in the characteristics of organic peracids and inorganic peroxides, particularly in regard to the manner in which they undergo decomposition, make it unlikely that a substance which functions as a stabilizer for inorganic peroxide solutions will also function as a stabilizer for a solution of an organic peracid or its salt.

The decomposition of solutions of hydrogen peroxide or its metallic derivatives has been extensively studied and it has been found that the only products of decomposition of such solutions are molecular oxygen and water or a metal oxide. This decomposition is commonly accepted as taking place according to the following equation:

(1) $\qquad 2H_2O_2 \rightarrow 2H_2O + O_2$

Thus the stabilization of inorganic peroxide solutions is concerned only with retarding or arresting the breakdown of inorganic peroxides into molecular oxygen and water or a metal oxide, as indicated by the foregoing equation.

While the decomposition of solutions of organic peracids or their salts has not been investigated as fully as that of inorganic peroxides, sufficient experimental evidence is available to show that the peracid decomposition is more complicated than that of inorganic peroxides. Analyses of peracid solutions undergoing decomposition show that the decomposition products are hydrogen peroxide, carbon dioxide and other gaseous products, as well as acids, salts and molecular oxygen. For example, analysis of a peracetic acid solution and its decomposition products showed that hydrogen peroxide was formed in the solution and that gaseous products evolved consisted of 56.6% molecular oxygen and 16.7% carbon dioxide. The remaining gaseous products were not identified.

The molecular oxygen formed in the decomposition of the organic peracid solutions may be explained, at least in part, by a mechanism like that set up for the decomposition of inorganic peroxides. In this instance, the peracid breakdown to an acid or its salt and molecular oxygen according to the following equation is:

(2) 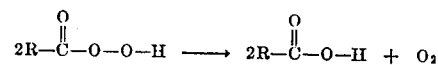

The presence of hydrogen peroxide among the decomposition products of organic peracids indicates that the peracid undergoes a second type of breakdown. In this case, the peracid reacts with some of the water present to form an acid or its salt and hydrogen peroxide. This hydrolysis of the peracid is illustrated by the following equation in which R represents an organic radical:

(3) 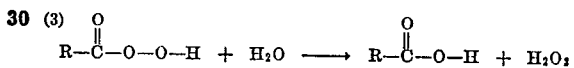

Furthermore, the presence of carbon dioxide among the decomposition products of the peracids is incontrovertible evidence that the decomposition of peracids may proceed by way of a third type of reaction. As carbon dioxide is the ultimate product of the oxidation of organic material, and since the organic peracid is the only organic material present in the solution, the carbon dioxide must result from the oxidation of the peracid itself. Also the peracids are oxidizing agents of high activity, much higher in oxidizing activity than inorganic peroxides, hence it is very likely that decomposition of the peracid occurs by auto-oxidation or by intra-molecular oxidation, in which the percarboxyl group of a peracid oxidizes another peracid molecule, yielding carbon dioxide and other organic oxidation products, and probably molecular oxygen as well. This reaction cannot be illustrated by an equation, as the products, except for carbon dioxide, are not the same for all peracids.

The three types of reaction given above for the decomposition of peracids are probably not the only ones which may take place, but they are the simplest which adequately explain the formation of the decomposition products. Experimental evidence also indicates that the proportion of the decomposition of peracids accounted for by each type of reaction varies not only with different peracids, but also with the conditions of concentration, alkalinity or acidity, temperature, and nature of catalysts to which any individual peracid solution may be subjected. This complex decomposition of peracid solutions involving several different mechanisms of decomposition is in marked contrast to the decomposition of inorganic peroxide solutions where only a single mechanism is involved. Hence, because of essential differences in the manner of the decomposition of organic peracids and inorganic peroxides, the stabilization of these two types of active oxygen compounds cannot be considered as the same problem.

The decomposition of peracids into acid and molecular oxygen according to Equation (2) above, is so similar to that of inorganic peroxides (Equation (1) above) that the applications of methods of stabilizing peroxides to the stabilization of organic peracids would be expected to be highly effective in view of the highly developed state of the art of stabilizing inorganic peroxides. However, this expectancy has not been realized. When methods of stabilizing inorganic peroxide solutions are applied to organic peracids, the results in general are negative so far as the decomposition of the peracid is concerned. In some cases on increase in the rate of the decomposition of the peracid is obtained instead of the desired decrease. For example, sodium silicate, which is a widely used stabilizer for alkaline peroxide solutions, appears to increase the rate of decomposition of peracids in alkaline solutions. In addition, aluminum, cadmium, and zinc compounds are considered to be effective stabilizers for peroxide solutions over certain pH ranges, yet these materials have very little, if any, practical stabilizing effect on solutions of organic peracids under conditions where they are effective with peroxide solutions. Hence it must be recognized that stabilizing of organic peracid solutions involves retarding or arresting the decomposition of peracids which takes place in several ways, and of which only one is similar to the way in which the inorganic peroxides decompose.

Thus it is readily apparent that the art of stabilizing peroxides and the methods of stabilizing peroxide solutions cannot be carried over to the field of peracid stabilization with any reasonable expectancy of obtaining satisfactory results.

Although we have tried many agents in an effort to secure a satisfactory stabilizer for aqueous solutions of peracids, particularly the organic peracids, and their salts, after considerable investigation we have ascertained that pyrophosphoric acid and the pyrophosphates are by far the most effective. The sodium salts of pyrophosphoric acid, such, for example, as tetrasodium pyrophosphate, have been found to possess outstanding stabilizing ability. Salts of pyrophosphoric acid other than tetrasodium pyrophosphate, such for example as tetrapotassium pyrophosphate and magnesium pyrophosphate, may also be utilized. Sodium acid pyrophosphate has also been found to be particularly effective, as has pyrophosphoric acid itself. Moreover, mixtures of various of these stabilizing agents, such as mixtures of tetrasodium pyrophosphate with other compounds such as benzene phosphonic acid, citric acid, tartaric acid, sodium stannate, or acetanilide, may be employed with advantage in our method for the stabilization of aqueous solutions of peracids and their salts. Generally, because of its relative cheapness and high stabilizing effect, we prefer to utilize tetrasodium pyrophosphate, either alone or in admixture with the various other agents specified. Accordingly, we will refer hereinafter to the tetrasodium salt in describing certain improved embodiments of our invention, but this salt is taken merely as illustrative, and we do not thereby intend to intimate that pyrophosphoric acid and the other pyrophosphates, the full equivalents of tetrasodium pyrophosphate in this process, could not be effectively employed under the same conditions.

Taking tetrasodium pyrophosphate as illustrative, we have found that it is an effective stabilizing agent either in the form of its hydrate ($Na_4P_2O_7 \cdot 10H_2O$) or in lower hydrated or anhydrous form. Similarly other pyrophosphates, such for example as tetrapotassium pyrophosphate or magnesium pyrophosphate, may be utilized in either anhydrous or hydrated forms.

We have discovered that the minimum concentration per liter of solution of tetrasodium pyrophosphate required effectively to stabilize the aqueous solution of peracid or persalt is approximately 0.015 gram. Surprisingly enough, this amount is independent of the concentration of the peracid or persalt in the aqueous solution, the pH of the solution, or the temperature conditions. When the concentration of tetrasodium pyrophosphate in the aqueous solution is decreased below 0.015 gram per liter some stabilizing action is obtained, but a high degree of stabilization is not obtained. Amounts of the pyrophosphate greater than 0.015 gram per liter do not appreciably increase the stability of the aqueous solution, but in practice are preferably utilized in order to secure sufficient stabilizing agent in the aqueous bath.

While tetrasodium pyrophosphate has considerable stabilizing action over a wide range of peracid or persalt concentrations, under a variety of temperatures, conditions of pH, and stabilizer concentration, it is generally within temperature ranges of 40 to 180° F. and a pH range 4.0 to 11.0 that solutions of the peracids are ordinarily utilized for various commercial purposes. While a concentration of 0.015 gram of tetrasodium pyrophosphate per liter is sufficient for stabilizing aqueous solutions of peracids or persalts under these conditions, we prefer to employ amounts as high as 0.25 gram of the salt per liter. Ordinarily the solutions stabilized will have pH values falling within the range 5.0 to 9.0, these solutions being maintained at temperatures of 60 to 150° F. Ordinarily the concentration of peracid or persalt in these solutions will not exceed about 4 volumes. It may here be noted that the concentration of percompounds in aqueous solutions is frequently conveniently expressed in terms of the volume concentration of the solution. The volume concentration is defined as the number of volumes of oxygen gas, measured at 0° C. and 760 millimeters of mercury pressure, that will be released, upon complete decomposition, from each volume of the solution measured at 20° C.

As examples of our improved method for the stabilization of solutions of peracids and persalts, the following may be given:

EXAMPLE 1

An aqueous solution of peracetic acid of 1.0 vol. concentration was stabilized by the addition thereto of 0.25 gram of tetrasodium pyrophosphate per liter of solution. The stabilized solution was split into various portions and the pH values of these portions were adjusted to the following specific pH's: 6.0; 7.0; 8.0; 9.0; 10.0.

An unstabilized aqueous solution of peracetic acid, containing no tetrasodium pyrophosphate, of 1.0 volume concentration, was prepared and split into five fractions. The pH value of each of these fractions was adjusted to the same five pH values as the stabilized fractions.

All samples were then stored at a temperature of 90° F. and analyzed periodically to determine peracid decomposition. The time was noted in each case when 50% decomposition of peracid occurred. The times required for 50% decomposition, both for the stabilized and unstabilized samples at the pH values noted, are given in the following table:

TABLE 1
*Stabilized samples*

| pH of peracetic acid solution | Time in hours required for 50% decomposition |
| --- | --- |
| 6.0 | 25.5 |
| 7.0 | 26.7 |
| 8.0 | 4.0 |
| 9.0 | 3.6 |
| 10.0 | 5.3 |

*Unstabilized samples*

| pH of peracetic acid solution | Time in hours required for 50% decomposition |
| --- | --- |
| 6.0 | 9.5 |
| 7.0 | 2.7 |
| 8.0 | 0.45 |
| 9.0 | 1.4 |
| 10.0 | 4.0 |

The stabilizing effect of tetrasodium pyrophosphate at the various pH values falling within the range 6.0 to 10.0 is apparent from the table.

EXAMPLE 2

Aqueous solutions of peracetic acid, all having a pH of 8.0 but of various volume concentrations ranging from 0.25 volume to 4.0 volume, were prepared. A part of these solutions of each volume concentration was stabilized by the addition of tetrasodium pyrophosphate in the amount of 0.25 gram per liter. The remaining solution was unstabilized.

All samples were then stored at 90° F. and periodically analyzed to determine peracid decomposition. The time required for 50% decomposition of the peracetic acid in each instance was noted. The results are given in the following table:

TABLE 2
*Stabilized samples*

| Volume concentration of peracetic acid solution | Time in hours required for 50% decomposition |
| --- | --- |
| 0.25 | 6.9 |
| 0.5 | 5.5 |
| 1.0 | 4.0 |
| 2.0 | 1.5 |
| 4.0 | 1.1 |

*Unstabilized samples*

| Volume concentration of peracetic acid solution | Time in hours required for 50% decomposition |
| --- | --- |
| 0.25 | 1.2 |
| 0.5 | 1.0 |
| 1.0 | 0.45 |
| 2.0 | 0.3 |
| 4.0 | 0.3 |

EXAMPLE 3

Various samples of aqueous peracetic acid solutions were prepared, all of 1.0 volume concentration. The pH of all solutions was then carefully adjusted to 8.0. To certain portions tetrasodium pyrophosphate was added as a stabilizer, in amount 0.25 gram per liter of solution, while other portions were allowed to remain unstabilized.

Comparable stabilized and unstabilized samples were then stored at temperatures of 60° F., 90° F., and 120° F. In each case the solutions were periodically analyzed to determine the time required for 50% decomposition of the peracid. The results are given in the following table:

TABLE 3
*Stabilized solutions*

| Temperature of storage | Time in hours required for 50% decomposition |
| --- | --- |
| 60° F | 77 |
| 90° F | 12 |
| 120° F | 0.63 |

*Unstabilized solutions*

| Temperature of storage | Time in hours required for 50% decomposition |
| --- | --- |
| 60° F | 1.6 |
| 90° F | 0.45 |
| 120° F | 0.2 |

The results clearly show the stabilizing effect of tetrasodium pyrophosphate.

EXAMPLE 4

An aqueous solution of peracetic acid of 1.0 volume concentration was prepared. The pH of the solution was carefully adjusted to 8.0. It was then split into various fractions and various amounts of tetrasodium pyrophosphate per liter of solution, ranging from 0.005 gram per liter to 4.0 grams per liter, were added. One sample of the solution was permitted to remain unstabilized.

All samples were then stored at 90° F. and periodically analyzed to determine peracid decomposition. The time in each instance required for 50% decomposition of peracetic acid was observed and is recorded in the following table:

TABLE 4

| Grams of tetrasodium pyrophosphate per liter of solution | Time in hours required for 50% decomposition |
| --- | --- |
| 0.0 (unstabilized) | 0.45 |
| 0.005 | 1.08 |
| 0.015 | 4.0 |
| 0.25 | 4.0 |
| 1.0 | 4.0 |
| 2.0 | 4.5 |
| 4.0 | 3.8 |

EXAMPLE 5

The following comparative test was carried out to show the superiority of tetrasodium pyrophosphate to other stabilizers frequently used for stabilizing hydrogen peroxide solutions when employed for stabilizing aqueous solutions of peracids and persalts.

Various stabilizing agents were added to an aqueous solution of peracetic acid of 1.0 volume concentration having a pH of 8.0. These stabilizing agents were as follows: aluminum sulfate, cadmium sulfate, zinc sulfate, phenacetin, and tetrasodium pyrophosphate. The first four are well-known stabilizers for hydrogen peroxide solutions. In all cases the amount added was 0.25 gram per liter of solution.

All samples were then stored at 90° F. and periodically analyzed to determine peracid decomposition. In each case the time required for 50% decomposition was observed and is given in the following table:

TABLE 5

| Agent added to aqueous peracetic acid solution | Time in hours required for 50% decomposition |
| --- | --- |
| Aluminum sulfate | 3.0 |
| Cadmium sulfate | Less than 1 |
| Zinc sulfate | 1.5 |
| Phenacetin | Less than 1 |
| Tetrasodium pyrophosphate | 7.5 |

The greater time required for 50% decomposition in the case of the solutions stabilized with tetrasodium pyrophosphate clearly shows the greater effectiveness of that stabilizing agent.

EXAMPLE 6

Ground wood pulp was bleached, in accordance with the procedure described in the copending application of Reichert, McNeight and Elston, S. N. 355,813 filed September 7, 1940, with an aqueous solution of peracetic acid of 1.0 volume concentration (equivalent to 1.24% $Na_2O_2$, based on the dry weight of the ground wood pulp). The pH of the aqueous slurry was 5.0 and the bleaching was carried out at a temperature of 150° F.

In treating the first batch of ground wood pulp no stabilizing agent was present in the peracetic acid solution. The run was repeated four times using stabilized peracetic acid solution, the stabilizer in each instance being tetrasodium pyrophosphate present in the following amounts, based on the dry weight of the ground wood pulp: 0.01%, 0.13%; 0.25%; 0.5%.

In each instance the time required to exhaust the active oxygen content of the solution was determined. The brightness of the pulp before the bleaching was 54.4. In each instance at the conclusion of the bleaching, when the active oxygen content of the slurry was completely exhausted, the brightness of the bleached pulp was determined. The results are given in the following table:

TABLE 6

| Percent of tetrasodium pyrophosphate stabilizer based on dry weight of ground wood pulp | Time in hours required to exhaust active oxygen content | Brightness of bleached ground wood pulp |
| --- | --- | --- |
| 0.00 (no stabilizer) | 0.6 | 56.3 |
| 0.01 | 1.5 | 57.1 |
| 0.13 | 2.75 | 60.0 |
| 0.25 | 2.75 | 60.1 |
| 0.5 | 2.75 | 61.6 |

The results clearly show the advantages, as far as the bleaching of ground wood pulp is concerned, of utilizing sufficient tetrasodium pyrophosphate in the peracid solution to stabilize the peracid.

Sulfite and kraft pulp, similarly treated, gave equivalent results. These pulps were treated in accordance with the procedure disclosed in the Reichert, McNeight and Elston application, S. N. 327,246 filed April 1, 1940, tetrasodium pyrophosphate being present in the slurry of pulp in peracid solution for the purpose of stabilizing the latter.

EXAMPLE 7

Aqueous solutions of the following organic peracids, each of 1.0 volume concentration, were stabilized with tetrasodium pyrophosphate; monopersuccinic acid; perpropionic acid; monoperphthalic acid; and monopermaleic acid. The amount of the stabilizer added in each case was equivalent to 0.25 gram of the salt per liter of peracid solution.

Each solution was adjusted to a pH of 8.0 and stored at 90° F. For comparison purposes similar solutions of the same pH but containing no stabilizing agent were stored under the same conditions. In each case the solutions were analyzed periodically and the time required for 50% decomposition of peracid noted. The times required in each instance for 50% decomposition are given in the following table:

TABLE 7

| Aqueous solution of peracid | Time required in hours for 50% decomposition of of peracid | |
| --- | --- | --- |
| | Unstabilized sample | Sample stabilized with tetrasodium pyrophosphate |
| Monopersuccinic | 2.75 | 13.0 |
| Perpropionic | 1.4 | 30.5 |
| Monoperphthalic | 2.6 | 5.4 |
| Monopermaleic | 0.5 | 1.2 |

Wherever reference is made herein to a peracid or to an organic peracid it is meant to include within the scope of that term salts of these peracids such as the alkali metal, other metal, or ammonium salts thereof. In aqueous solution the peracids and the persalts are of course full equivalents of each other, depending on the particular pH of the solution. Similarly, wherever we have made reference herein to a pyrophosphate, it is intended to include pyrophosphoric acid within the scope of that term.

Various changes may be made in the procedures given herein as illustrative of the preferred embodiment of our invention without departing from the scope thereof. Accordingly, the invention is to be construed in accordance with the prior art and appended claims, and is not necessarily to be restricted to specific temperatures, conditions, or amounts given herein as illustrative.

We claim:

1. The method of stabilizing an aqueous solution of an organic peracid which comprises incorporating therein stabilizing amounts of a pyrophosphate.

2. The method of stabilizing an aqueous solution of an organic peracid which comprises incorporating in said solution a stabilizer selected from the group consisting of pyrophosphoric acid, tetrasodium pyrophosphate, sodium acid pyrophosphate, tetrapotassium pyrophosphate, and magnesium pyrophosphate.

3. The method of stabilizing an aqueous solution of an organic peracid selected from the group which consists of peracetic acid, monopersuccinic acid, perpropionic acid, monoperphthalic acid, and monopermaleic acid which comprises incorporating therein stabilizing amounts of a pyrophosphate.

4. An aqueous solution of an organic peracid containing stabilizing amounts of a pyrophosphate.

5. A stabilized aqueous solution of an organic peracid containing stabilizing amounts of a pyrophosphate selected from the group consisting of pyrophosphoric acid, tetrasodium pyrophosphate, sodium acid pyrophosphate, tetrapotassium pyrophosphate, and magnesium pyrophosphate.

6. An aqueous solution of an organic peracid selected from the group consisting of peracetic acid, monopersuccinic acid, perpropionic acid, monoperphthalic acid, and monopermaleic acid, containing stabilizing amounts of a pyrophosphate.

7. The method of stabilizing an aqueous solution of a peracid having a temperature falling within the range 40 to 180° F. and a pH falling within the range 4.0 to 11.0 which comprises incorporating therein a pyrophosphate in stabilizing amounts.

8. The method of stabilizing an aqueous solution of a peracid having a pH falling within the range 5.0 to 9.0, said solution being maintained at a temperature of 60 to 150° F. and having a concentration not exceeding 4.0 volumes, which comprises incorporating in said aqueous solution a pyrophosphate.

9. The method of stabilizing an aqueous solution of an organic peracid which comprises incorporating therein tetrasodium pyrophosphate.

10. The method of stabilizing an aqueous solution of a peracid which comprises incorporating therein tetrasodium pyrophosphate and one or more of the compounds selected from the group which consists of citric acid, and tartaric acid.

11. A stabilized aqueous solution of an organic peracid containing stabilizing amounts of tetrasodium pyrophosphate.

12. A stabilized aqueous solution of an organic peracid containing stabilizing amounts of tetrasodium pyrophosphate, and one or more of the compounds selected from the group which consists of citric acid, and tartaric acid.

13. An aqueous solution of an organic peracid of not over 4.0 volume concentration having a pH falling within the range 4.0 to 11.0 and containing stabilizing amounts of a pyrophosphate.

14. An aqueous solution of an organic peracid selected from the group which consists of peracetic acid, monopersuccinic acid, perpropionic acid, monoperphthalic acid, and monopermaleic acid, there being present in said aqueous solution stabilizing amounts of tetrasodium pyrophosphate.

15. A stabilized aqueous solution of an organic peracid having a pH falling within the range 4.0 to 11.0 and a volume concentration not exceeding 4.0 volumes, which solution contains stabilizing amounts of tetrasodium pyrophosphate.

16. A stabilized aqueous solution of an organic peracid containing tetrasodium pyrophosphate in amount equivalent to at least 0.015 gram per liter of solution.

17. A stabilized aqueous solution of an organic peracid containing tetrasodium pyrophosphate in amount equivalent to 0.25 gram per liter of solution.

JOSEPH S. REICHERT.
SAMUEL A. McNEIGHT.
ARTHUR A. ELSTON.